United States Patent [19]

Kaiser et al.

[11] Patent Number: 4,748,647
[45] Date of Patent: May 31, 1988

[54] FUEL TUBE BARRIER GAUGE

[75] Inventors: Bruce J. Kaiser, Cincinnati, Ohio; Fred C. Schoenig, Jr.; Alfred J. Zeits, both of Wilmington, N.C.

[73] Assignee: General Electric Company, San Jose, Calif.

[21] Appl. No.: 764,455

[22] Filed: Aug. 12, 1985

[51] Int. Cl.⁴ ............................................. G01B 15/02
[52] U.S. Cl. .................................. 378/50; 378/59; 378/44
[58] Field of Search .............. 378/50, 44, 45, 46, 378/47, 48, 49, 59

[56] References Cited

U.S. PATENT DOCUMENTS

| | | | |
|---|---|---|---|
| 2,859,349 | 11/1958 | Bradley et al. | 378/59 |
| 3,497,691 | 2/1970 | Chen | 378/50 |
| 3,560,742 | 2/1971 | Weinsteck et al. | 250/308 |
| 4,038,550 | 7/1977 | Wassen et al. | 250/358 |
| 4,129,778 | 12/1978 | Inove et al. | 378/50 |
| 4,147,931 | 4/1979 | Puumalainen | 378/50 |
| 4,162,528 | 7/1979 | Maldonado et al. | 364/563 |
| 4,208,581 | 6/1980 | Kaneko | 375/50 |

FOREIGN PATENT DOCUMENTS

| | | |
|---|---|---|
| 2121601 | 11/1972 | Fed. Rep. of Germany. |
| 2946567 | 6/1980 | Fed. Rep. of Germany. |
| 0223006 | 12/1983 | Japan ........................... 378/50 |

OTHER PUBLICATIONS

"Isotopenpraxis" 16th vol. No. 8/1974, pp. 303-305.

Primary Examiner—Janice A. Howell
Assistant Examiner—David P. Porta
Attorney, Agent, or Firm—Robert R. Schroeder

[57] ABSTRACT

An apparatus using X-ray fluorescence for gauging the thickness of a zirconium barrier layer on the interior surface of a zirconium alloy nuclear fuel tube is disclosed. A gamma radiation source coaxially positioned in the tube emits gamma rays which excite K-alpha and K-beta Sn X-ray in the zirconium alloy substrate. Fluorescent X-rays passing back through the barrier layer are detected by an X-ray detector coaxially positioned in the tube. Attenuation of the exciting gamma rays and the fluorescent X-rays by the barrier layer is used to determine barrier layer thickness.

8 Claims, 2 Drawing Sheets

FUEL TUBE BARRIER GAUGE

BACKGROUND OF THE INVENTION

This invention relates generally to a method and apparatus for gauging the thickness of a thin layer of material on a surface and more specifically to gauging the thickness of a zirconium barrier layer on the interior surface of zirconium alloy nuclear fuel rods.

The fuel elements used in existing nuclear reactors are found in various geometric shapes, such as plates, tubes, or rods. The fuel material is usually enclosed in a corrosion-resistant, nonreactive, heat-conductive container or cladding. The elements may be positioned in a matrix at fixed distances from each other so as to form a fuel assembly. A sufficient number of fuel assemblies are combined to form a nuclear fission assembly, i.e. a reactor core capable of a self-sustained fission reaction. The core in turn is enclosed within a reactor vessel through which a coolant is passed.

The cladding on each fuel element serves several purposes. The primary functions are first, to prevent contact and chemical reactions between the nuclear fuel and the coolant and/or the moderator; and second, to prevent the radioactive fission products, some of which are gases, from being released from the fuel into the coolant and/or the moderator. Materials commonly used for cladding are stainless steel, aluminum and its alloys, zirconium and its alloys, niobium, certain magnesium alloys and others. If the cladding leaks, or if it should fail, it is possible that the coolant or moderator and the associated systems will be contaminated with long-lived radioactive products to a degree which may interfere with plant operation.

The manufacture and/or the operation of nuclear fuel elements which employ certain metals and alloys as the cladding material may, in some situations, set up the conditions that could give rise to the aforesaid leaks or failure. For example, problems may be caused by mechanical or chemical reactions of the cladding materials under certain conditions. Zirconium and its alloys, under normal circumstances, are well suited for use as nuclear fuel claddings since they have low neutron absorption cross sections. At temperatures below about 750° F. (about 398° C.), such materials are strong, ductile, extremely stable and non-reactive in the presence of demineralized water or steam, which are commonly used as reactor coolants and moderators.

However, where zirconium alloy cladding is used, it has been found expeditious to provide a thin barrier layer between the nuclear fuel material and the cladding material, in order to reduce the possibility of interactions between the fuel material and the cladding. See for example, U.S. Pat. Nos. 4,200,492 and 4,372,817. This barrier layer serves to inhibit damaging interaction between the fuel pellets and the cladding of the nuclear fuel element. Thus, the barrier layer, which may advantageously comprise a low neutron absorption metal such as pure zirconium, serves to protect the substrate from interaction between the fuel pellets and the cladding substrate.

In order to assure quality control, it is desirable to know the thickness of this barrier layer which must be kept uniform throughout. One method for determining the thickness of the layer employs computer controlled metallography and involves time consuming visual measurements. A short piece, about 2 inches long, is cut from each fuel rod during the rod manufacturing process. A small number of these pieces are then taken for testing. A small plastic plug is inserted into one end of the piece and that end is polished and chemically treated so that the barrier layer becomes visible. This end is then placed under a microscope and thickness measurements are visually made at eight places around the circumference of the tube. This procedure involves a significant amount of wasted tube material and, because of the time required in such a procedure, as well as the attendant expense for labor, barrier layer thickness is generally measured on only about 5% of all fuel rods manufactured.

The measurement of coating thickness by X-ray fluorescence is widely known and practiced in different industries, for example to measure the thickness of metal coatings or of paint. See, for example, U.S. Pat. No. 4,208,581. However, such a technique is generally used on planar surfaces only, which can be conveniently accessed so that the size of the measuring apparatus is not critical. For a barrier layer on the inside surface of a nuclear fuel tube having an inside diameter of less than 0.5 inches, heretofore available techniques and apparatus therefor have proved to be incapable of adaptation to such constricted space conditions.

OBJECTS OF THE INVENTION

It is therefore a primary object of the present invention to provide a method and apparatus for the measurement of barrier layer thickness on the inside surface of a relatively small diameter tube which is not subject to the foregoing problems and disadvantages.

It is another object of the present invention to provide a method and apparatus for carrying out a relatively fast measurement of barrier layer thickness.

It is a further object of the present invention to provide a method and apparatus for the measurement of barrier layer thickness which has a high degree of accuracy.

It is still another object of the present invention to provide a relatively inexpensive method and apparatus for measuring barrier layer thickness on the inside surface of a small diameter tube which does not involve any waste of tube material.

SUMMARY OF THE INVENTION

The foregoing objects of the invention are achieved through the use of a new and improved technique and X-ray fluorescence gauging apparatus therefor capable of measuring barrier layer thickness on the inside surface of small diameter tubes. In a preferred embodiment, the invention is applied to the measurement of a zirconium barrier layer on the inside of a Zircaloy nuclear fuel tube, wherein the Zircaloy material includes tin. The invention utilizes the attenuation produced by the barrier layer of (1) the exciting gamma radiation from a source axially positioned in the tube and (2) tin X-rays generated in the Zircaloy substrate by collisional excitation resulting from the gamma rays. The thickness of the zirconium barrier layer is determined by measuring the number of K-alpha and/or K-beta tin X-rays which result from the excitation and which are transmitted back through the barrier layer to an X-ray detector positioned in the tube.

DETAILED DESCRIPTION OF THE INVENTION

Figure 1:
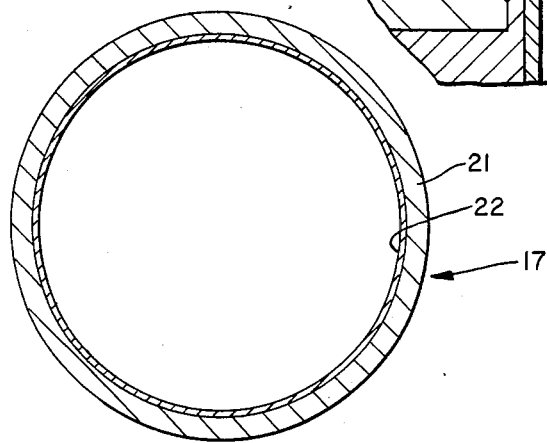
FIG. 1 is a cross-sectional view of a typical nuclear fuel rod.

Referring now to the drawings, and more particularly to FIG. 1, a cross sectional view of a cladding or fuel tube 17 is shown. Tube 17 has a substrate 21 selected from conventional cladding materials such as stainless steel and zirconium alloys. In a preferred embodiment of the invention the substrate comprises a zirconium alloy containing tin, such as the alloy of U.S. Pat. No. 2,772,964, Zircaloy-2. A barrier layer 22 is metallurgically bonded to the inside surface of substrate 21 and forms a shield between the substrate and nuclear fuel material held in the tube. The barrier layer constitutes between about 1–30% of the thickness of the cladding and consists of a low neutron absorption material such as of substantially pure zirconium. In a preferred embodiment, the Zircaloy tube has an inner diameter of approximately 0.420 inches with a wall thickness of 0.032 inches and a 0.003 inch zirconium barrier layer. Barrier layer 22 serves to protect the substrate portion of the cladding from contact and interaction with the fuel pellet.

Figure 2:
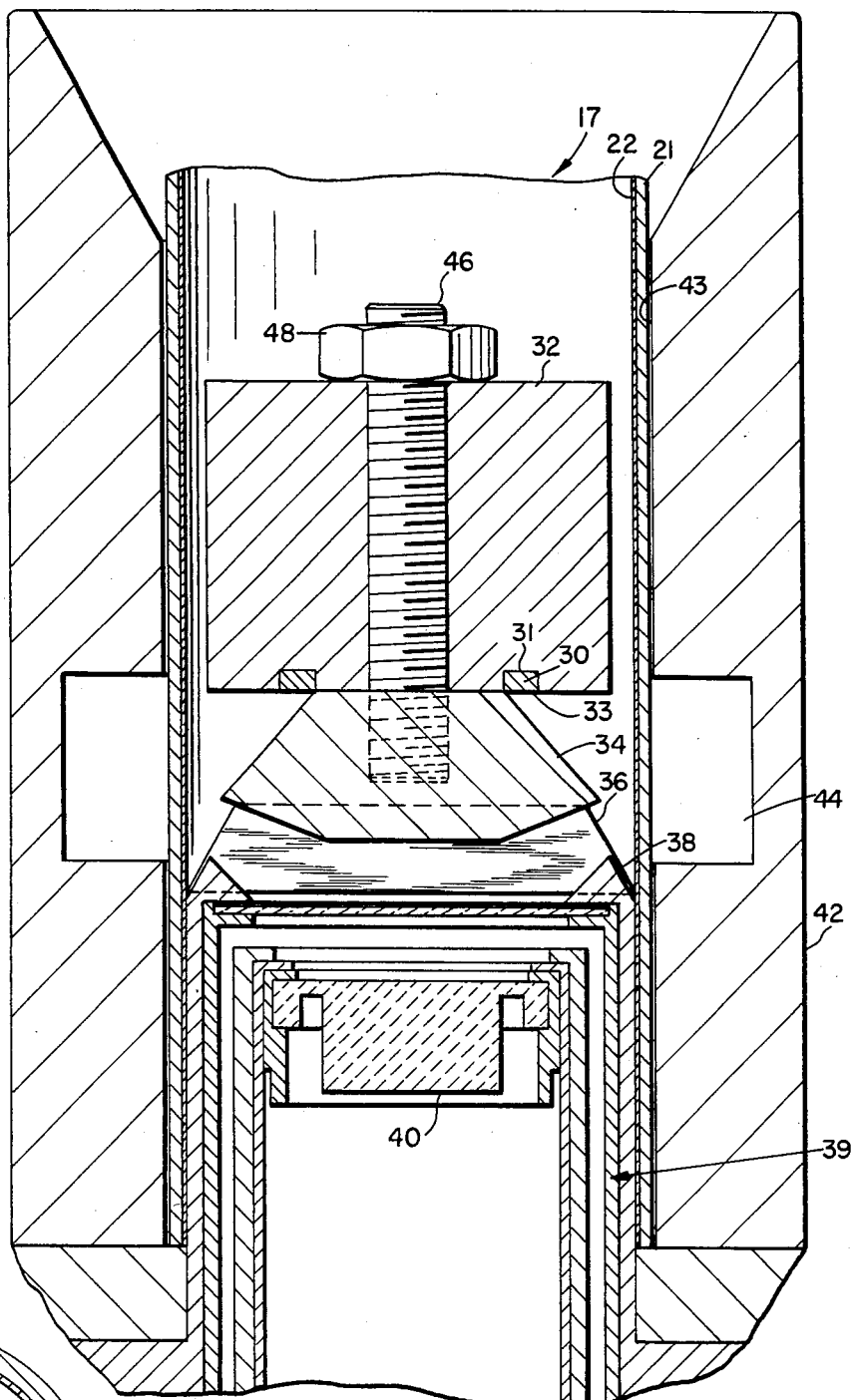
FIG. 2 is a cross-sectional view of a preferred embodiment of a fuel tube barrier gauge in accordance with the present invention.

Referring now to FIG. 2 which shows a cross-sectional view of the preferred fuel tube barrier gauge, a gamma radiation source 30 is positioned in an annular groove 31 in the face of a source holder 32. Gamma source 30, which in a preferred embodiment consists of americium ($241_{Am}$) which emits 60 KeV gamma-rays, is held in groove 31 by a thin stainless steel window 33. Source holder 32 is mounted so that it is coaxially surrounded by tube 17 when the latter is in place for a thickness measurement.

A supporting base 34 is attached to source holder 32, using a bolt 46 which extends through the source holder and a nut 48. As seen in FIG. 2, the base is in the shape of two oppositely converging truncated cones, wherein the face of one of the cones is in contact with the face of source holder 32 and contacts the latter face only within the inside diameter of groove 31. In a preferred embodiment, the base comprises platinum and acts as a shield against gamma radiation, as well as a shield against fluorescent X-rays originating outside a predetermined coaxial band of the tube. Base 34 is connected to a detector housing 38 by way of a foot 36, which may consist of a thin stainless steel plate in the shape of a trapezoid. Foot 36 is shaped and positioned to intercept a minimum number of fluorescent X-rays.

Detector housing 38 supports an X-ray detector 39 in coaxial alignment with source holder 32 and source 30. The detector preferably consists of a miniature, liquid nitrogen cooled Si(Li) X-ray detector. It contains an active area 40 which is responsive to the energy and the intensity of X-rays which reach it.

A cylindrical steel guide 42 is connected to detector housing 38 and surrounds the housing, base 34 and source holder 32. Guide 42 is adapted to support tube 17 when it is in the measuring position. Guide 42 comprises a cylindrical guide wall 43, which includes an annular chamber opening 44 which coaxially surrounds a predetermined band of the cladding and is adapted to reduce the number of undesired responsive X-rays that emanate from the guide and which reach detector active area 40.

As seen in FIG. 2, base 34 shields detector active area 40 from gamma rays emanating from source 30. The detector active area 40 is also shielded by detector housing 38 from any fluorescent X-rays coming from outside the predetermined band of tube material. Thus, only fluorescent X-rays from the predetermined band of tube material are seen by the detector.

In operation, gamma rays from source 30 are attenuated as they pass through barrier layer 22 into substrate 21. Some of the gamma rays reaching substrate 21 excite tin atoms to fluoresce and give off Sn K X-rays. The thickness of the zirconium barrier layer can be determined by measuring the number of K-alpha and/or K-beta Sn X-rays which result from that excitation and which are transmitted back through barrier layer 22 to detector 39. The ability of the apparatus to measure barrier layer thickness stems from the layer's attenuation of both the exciting gamma rays and the excited fluorescent X-rays.

Figure 3:
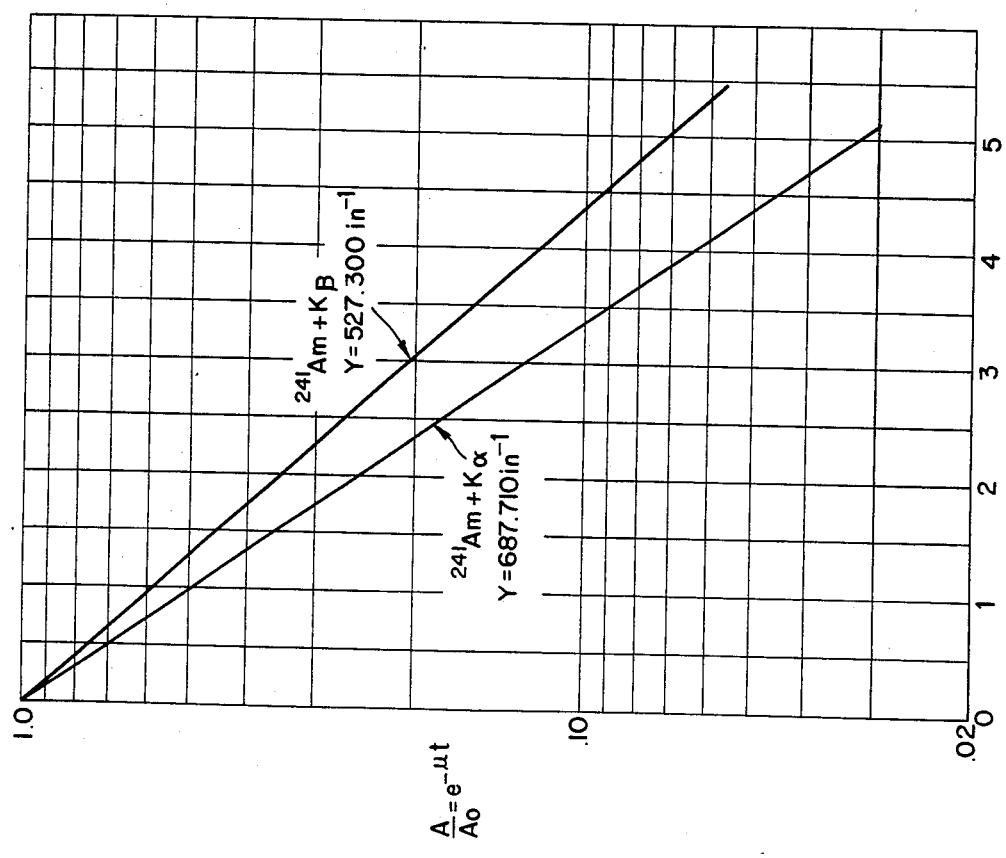
FIG. 3 shows in graph form the attenuation of K-alpha and K-beta Sn X-rays in zirconium.

FIG. 3 shows the relationship between the zirconium barrier layer thickness and the relative attenuation of the K-alpha (25.267 KeV) and K-beta (28.481 keV) Sn X-rays. These relationships can be used in three ways to determine the barrier layer thickness.

First, if a nominal count rate, $A_0$, (zero barrier thickness) is used as a constant for all tubes tested, then the measure of the X-ray event rate at the detector for either the unscattered K-alpha or K-beta Sn X-rays is determined by the following equation:

$$t = \frac{\ln(A/A_o)}{-\mu}$$

where t = barrier thickness in inches;
A = K-alpha (or K-beta) count rate of the sample;
Ao = nominal K-alpha (or K-beta) count rate for a tube without a barrier layer;
$\mu$ = Sum of the zirconium layer attenuation coefficients for the exciting Y radiation, as well as the K-alpha (or K-beta) Sn X-rays.

This is the simplest approach, but suffers from inaccuracy when the percent tin concentration of the zirconium alloy varies.

Second, an additional detector on the exterior of the tube can be used to determine an $A_0$ normalized to Sn concentration. This method eliminates the variability due to tin concentration.

An alternate method which eliminates the sensitivity to variability in tin concentration is to take the ratio of the K-alpha to K-beta events detected. Because of the difference in the attenuation coefficients of these two X-ray energies, a clearer functional relationship to barrier layer thickness, independent of tin concentration, is evident in the final equation below.

$$\frac{A_\alpha}{A_{o\alpha}} = Ke^{-\mu_\alpha t}$$

and $$\frac{A_\beta}{A_{o\beta}} = e^{-\mu_\beta t}$$

-continued then $$\frac{A\alpha}{A\beta} = Ke^{t(\mu\beta - \mu\alpha)}$$

thus $$t = \frac{\ln(A_\alpha / K^2 A_\beta)}{\mu_\beta - \mu_\alpha}$$

where
Ao$_\alpha$=KAo$_\beta$
K=a constant of proportionality
A$_{\alpha(\beta)}$=K-alpha (or K-beta) count rate of the sample.

Figure 4:
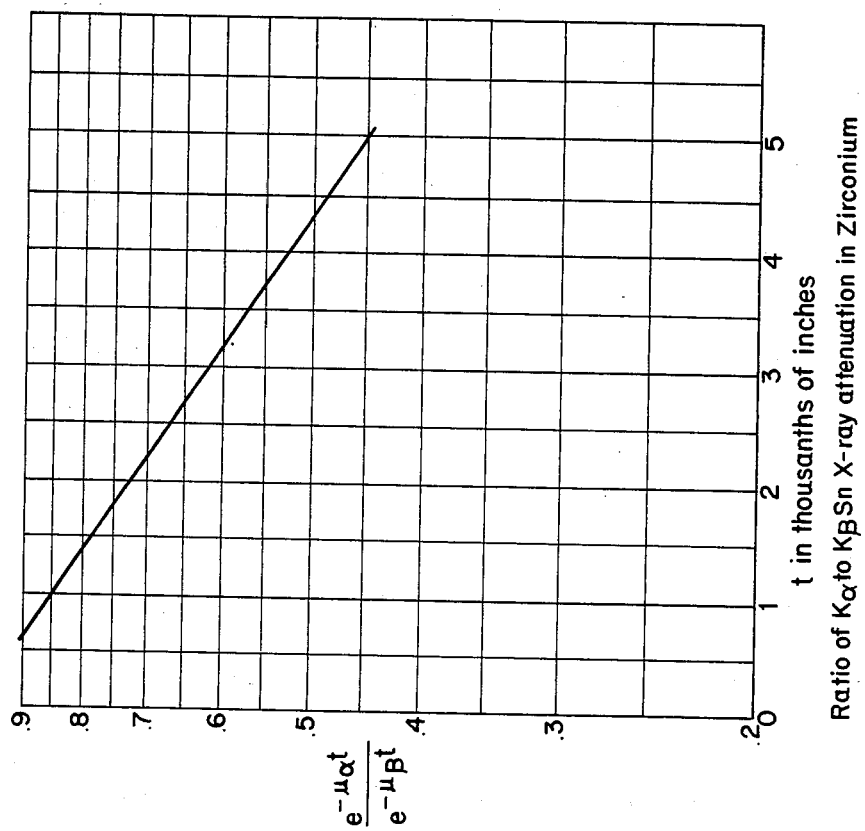
FIG. 4 is a graph of the functional relationship between K-alpha and K-beta Sn X-rays attenuated by zirconium.

FIG. 4 shows the above functional relationship graphically for tin K-alpha and K-beta X-rays attenuated by zirconium.

Each of the above methods is applicable to barrier layer thickness measurements. The optimum choice will depend on the desired accuracy, system simplicity, elemental composition, and the wall-barrier thickness involved.

While the present invention has been shown and described with reference to a preferred embodiment, it will be understood that numerous modifications, changes, variations, substitutions and equivalents will now occur to those skilled in the art without departing from the spirit and scope of the invention. Accordingly, it is intended that the invention herein be limited only by the scope of the appended claims.

What is claimed is:

1. Apparatus for measuring the thickness of a barrier layer on the inside surface of a cylindrical tube having a tube axis and a bore diameter less than approximately 0.5 inches, said tube comprising a material capable of x-ray fluorescence;

said apparatus comprising:
a source of gamma radiation in said tube having its own axis aligned with said tube axis, said source being positioned in said tube so as to directly irradiate a predetermined coaxial band of said tube material with gamma radiation;
means aligned with said tube axis and axially spaced from said source for detecting the energy and intensity of x-ray fluorescence emitted by said band upon excitation by said gamma radiation from said source; and
a supporting base coaxially positioned in said tube and axially interposed between said source and said detecting means, said base being shaped to shield said detecting means from direct gamma radiation from said source and from x-rays traveling through said barrier layer which emanate outside said predetermined coaxial band;
whereby the thickness of said barrier layer in said tube band is determined from the energy and the intensity of the x-rays sensed by said detecting means.

2. Apparatus according to claim 1 wherein said tube material comprises a zirconium alloy including tin, said tin being capable of X-ray fluorescence upon irradiation by said source; and
said detecting means comprising a liquid nitrogen-cooled Si(Li) X-ray detector for measuring the intensity and energy of X-rays emitted by said tin.

3. Apparatus according to claim 1 and further including a cylindrical source holder having a face substantially normal to the axis of said tube in contact with said base, said face including an annular coaxial groove having an inside diameter; and
said source having an annular configuration and being retained in said groove substantially flush with said face.

4. Apparatus according to claim 3 wherein at least a portion of said base is configured as a truncated cone, said cone including a coaxial planar face in contact with a portion of said source holder face defined by said inside diameter of said groove, and the conical surface of said cone diverging in a direction away from said contacting faces.

5. Apparatus for measuring the thickness of a substantially pure zirconium barrier layer on the inside surface of a nuclear fuel tube having a bore of a diameter less than approximately 0.5 inches, said tube consisting of a zirconium alloy including tin;

said apparatus comprising:
a cylindrical steel source holder within said tube and having a common axis therewith when said tube is in place for said thickness measurement, said source holder including a face oriented toward one end of said tube substantially normal to said common axis, said face including a coaxial annular groove having an inside diameter;
an annular source of gamma radiation positioned in said groove substantially flush with said face, said source being positioned to directly irradiate said tube with gamma rays through said barrier layer so as to cause X-rays fluorescence of said tin;
a coaxial supporting base attached to said source holder face, said base including a material of a thickness selected to shield a portion of said tube bore between said base and said tube end from direct gamma radiation from said soruce, at least a portion of said base being configured as a turncated cone having a coaxial planar face in contact with a portion of said source holder face defined by said inside diameter of said groove, the conical surface of said base portion diverging in the direction of said tube end;
an X-ray detector positioned along said common axis;
a detector housing fastened to said base and coaxially surrounding said detector, said housing supporting said detector in said shielded tube bore portion; and
said base and said housing being configured to permit exposure of said detector only to X-rays traveling through said barrier layer which emanate from a predetermined coaxial band of said tube;
whereby the thickness of said barrier layer in said tube band is determined from the energy and the intensity of the x-rays sensed by said detector.

6. Apparatus according to claim 5 wherein the constituent material of said source of gamma radiation comprises americium, said source being held in position in said groove by a thin stainless steel window which completely covers said groove.

7. Apparatus according to claim 5 and further including a cylindrical steel guide affixed to said housing, said guide comprising a cylindrical guide wall including an interior guide wall surface coaxially surrounding said housing, said base and said source holder; said guide being capable of removably supporting said tube between the last-recited surrounded components and said cylindrical guide wall;
said guide wall including an annular chamber opening onto said interior guide wall surface, said chamber coaxially surrounding said predetermined tube band when said tube is positioned in said guide to minimize the number of responsive X-rays emanating from said guide able to reach said detector.

8. A method for measuring the thickness of a barrier layer on the inside surface of the wall of a cylindrical tube having a tube axis and a bore diameter less tan approximately 0.5 inches, said tube comprising a material capable of X-ray fluorescence in response to incident gamma radiation through said barrier layer;

said method comprising the steps of:

radiating gamma rays from a first position on said tube axis at a predetermined coaxial band of said tube;

at a second position on said tube axis, detecting the energy and the intensity of X-rays traveling through said barrier layer which emanate from said predetermined coaxial band of said tube and which are due to said gamma rays;

shielding said second tube position from direct gamma radiation emanating from said first position and from X-rays emanating outside said tube band; and comparing the energy and the intensity of said detected X-rays with a standard to determine the thickness of said barrier layer.

* * * * *